(12) United States Patent
Hellgren et al.

(10) Patent No.: US 7,733,824 B2
(45) Date of Patent: Jun. 8, 2010

(54) FIXED ACCESS POINT FOR A TERMINAL DEVICE

(75) Inventors: Vesa Hellgren, Helsinki (FI); Sandro Grech, Helsinki (FI); Roman Pichna, Espoo (FI)

(73) Assignee: Nokia Corporation, Espoo (FI)

( * ) Notice: Subject to any disclaimer, the term of this patent is extended or adjusted under 35 U.S.C. 154(b) by 871 days.

(21) Appl. No.: 11/159,128

(22) Filed: Jun. 23, 2005

(65) Prior Publication Data

US 2006/0291448 A1 Dec. 28, 2006

(51) Int. Cl.
*H04W 4/00* (2009.01)
(52) U.S. Cl. ..................................... 370/328
(58) Field of Classification Search ............. 370/328, 370/338, 352; 455/410; 709/232
See application file for complete search history.

(56) References Cited

U.S. PATENT DOCUMENTS

| | | | | |
|---|---|---|---|---|
| 6,636,491 B1* | 10/2003 | Kari et al. | | 370/328 |
| 2001/0055379 A1* | 12/2001 | Mamiya et al. | | 379/201.05 |
| 2002/0085540 A1* | 7/2002 | Hyvarinen et al. | | 370/352 |
| 2003/0063592 A1* | 4/2003 | Seki et al. | | 370/338 |
| 2003/0131047 A1* | 7/2003 | Takeyoshi et al. | | 709/202 |
| 2003/0169712 A1 | 9/2003 | Tsao | | |
| 2004/0127195 A1* | 7/2004 | An | | 455/410 |
| 2004/0264435 A1 | 12/2004 | Chari et al. | | |
| 2005/0021781 A1* | 1/2005 | Sunder et al. | | 709/229 |
| 2005/0249121 A1* | 11/2005 | Matsunaga | | 370/238 |
| 2006/0094415 A1* | 5/2006 | Veron | | 455/419 |
| 2006/0153124 A1* | 7/2006 | Kant et al. | | 370/328 |
| 2006/0174001 A1* | 8/2006 | Zhu | | 709/225 |
| 2006/0174028 A1* | 8/2006 | Zhu | | 709/232 |
| 2006/0258356 A1* | 11/2006 | Maxwell et al. | | 455/436 |
| 2006/0276173 A1* | 12/2006 | Srey et al. | | 455/410 |
| 2008/0130637 A1* | 6/2008 | Kant et al. | | 370/389 |

FOREIGN PATENT DOCUMENTS

| | | |
|---|---|---|
| GB | 2401747 | 11/2004 |
| WO | WO 01/22048 | 3/2001 |

OTHER PUBLICATIONS

Shiao-Li Tsao, "Scalable Gateway GPRS Support Node for GPRS/UMTS Networks", 2002, pp. 2239-2243.
International Search Report for International Application No. PCT/FI2006/000194, filed Jun. 13, 2006.
Written Opinion for PCT/FI2006/000194 dated Dec. 20, 2006.

* cited by examiner

*Primary Examiner*—Lester Kincaid
*Assistant Examiner*—Nathan Mitchell
(74) *Attorney, Agent, or Firm*—Alston & Bird LLP (57) ABSTRACT

The invention allows providing a fixed access point for a terminal device. One of multiple access points is assigned to serve as a fixed access point for a terminal device based on a received identifier of the terminal device. A notification about the assignment of the fixed access point is transmitted to at least one of the terminal device and a gateway node serving the terminal device. As a result, Mobile IP based handover between GPRS and WLAN will be seamless. Furthermore, the invention allows using a dedicated gateway for infected terminals to provide quarantined access to network services.

27 Claims, 4 Drawing Sheets

Prior Art

FIXED ACCESS POINT FOR A TERMINAL DEVICE

BACKGROUND OF THE INVENTION

1. Field of the Invention

The invention relates to telecommunications. In particular, the invention relates to providing a fixed access point for a terminal device communicating with a packet data network via a mobile access system.

2. Description of the Related Art

In recent years mobile access systems, i.e. systems which allow mobile access to packet switched data communication networks or packet data networks, have emerged. The access provided by mobile access systems is typically, although not necessarily, wireless. Wireless Local Area Network (WLAN or Wireless LAN) is an example of a mobile access system. A Wireless LAN allows a mobile user to connect to a packet data network through a wireless connection. A standard, IEEE 802.11, specifies the technologies for Wireless LANs.

Another example of a mobile access system is General Packet Radio Service (GPRS). GPRS also allows packet data transmission for mobile communication networks. GPRS is designed to support e.g. digital mobile telecommunication networks based on the Global System for Mobile Communications (GSM) standard. However, GPRS is not restricted to only GSM networks but supports also for example $3^{rd}$ Generation Partnership Project (3GPP) based digital mobile telecommunication networks, or 3GPP systems for short.

Since the packet data networks typically utilize Internet Protocol (IP), Mobile Internet Protocol (Mobile IP) is typically utilized to provide mobility. Mobile IP is an extension to Internet Protocol aimed to provide mobility support for Internet Protocol. Using Mobile IP allows a terminal device to move from one link to another without changing its IP address (as seen by the layers above Internet Protocol) and yet be reachable by other terminal devices. Mobile IP is being developed by IETF (Internet Engineering Task Force) and full specifications may be obtained e.g. from http://www.ietf.org.

Mobile IP basically implements a forwarding system. When a mobile terminal device, or mobile node, is on its 'home' network, it functions normally. When it moves to a different network, data packets are forwarded from its home network to its new location. This allows normal hosts and routers that do not implement Mobile IP to continue to operate as if the mobile node had not moved. The router on the home network that is responsible for catching data packets intended for the mobile node and forwarding them to the mobile node when it is moving is called a home agent. The mobile node is assigned a permanent or semi-permanent IP address called a home address. When the mobile node is moving, it is also assigned a new, temporary address called a care-of address. The mobile node, being away from home, informs its home agent of its current care-of address with a process called registration after which the home agent will be able to forward the data packets addressed to the home address of the mobile node on to the care-of address of the mobile node.

Mobile access systems interface with packet data networks via access points. In other words, the access point is a network entity providing an interface via which a mobile access system may access a packet data network. For example, in the case of General Packet Radio Service, a network node called a Gateway GPRS Support Node (GGSN) typically comprises one or more access points serving as interfaces to external IP networks such as the Internet, other mobile service providers' GPRS services, or enterprise intranets. In the case of Wireless LAN, a network node called Packet Data Gateway (PDG) typically comprises one or more access points serving as interfaces to packet data networks. In the case of GPRS, the interface is referred to as Gi interface, whereas in the case of Wireless LAN, the interface is referred to as Wi interface. It should be noted that the term 'access point' is sometimes used in prior art, particularly in relation to Wireless LAN, to refer to a base station to which a mobile terminal device connects over a radio link. However, herein the term 'access point' is strictly used to refer to the above described network entity providing an interface via which a mobile access system may access a packet data network.

A current object on the field of telecommunications is to enable interworking between various mobile access systems, such as between GPRS systems and Wireless LANs so that e.g. resources and services within a GPRS system may be accessed by Wireless LAN users and vice versa. As part of this object, it is intended to integrate access points associated with various mobile access systems into one network node. For example, it is intended to implement the functionalities of a Gateway GPRS Support Node, a Packet Data Gateway and a home agent in one network node.

However, while the integration of the functionalities of the Gateway GPRS Support Node, the Packet Data Gateway and the home agent into one network node facilitates interworking between various mobile access systems, it also creates further problems of its own.

Figure 1A:
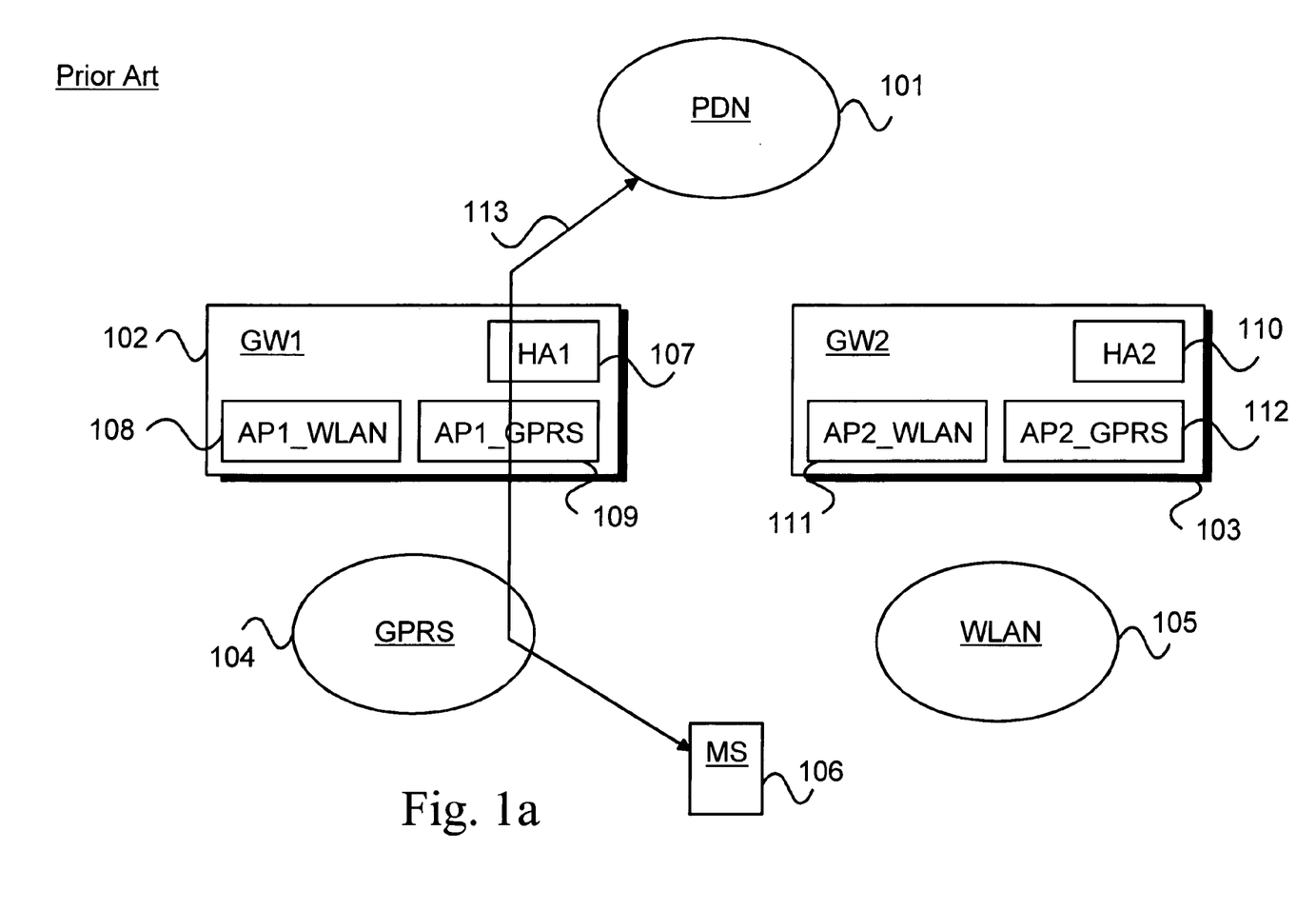
FIGS. 1a-1b illustrate prior art Mobile IP based handover between GPRS and WLAN.
Figure 1B:
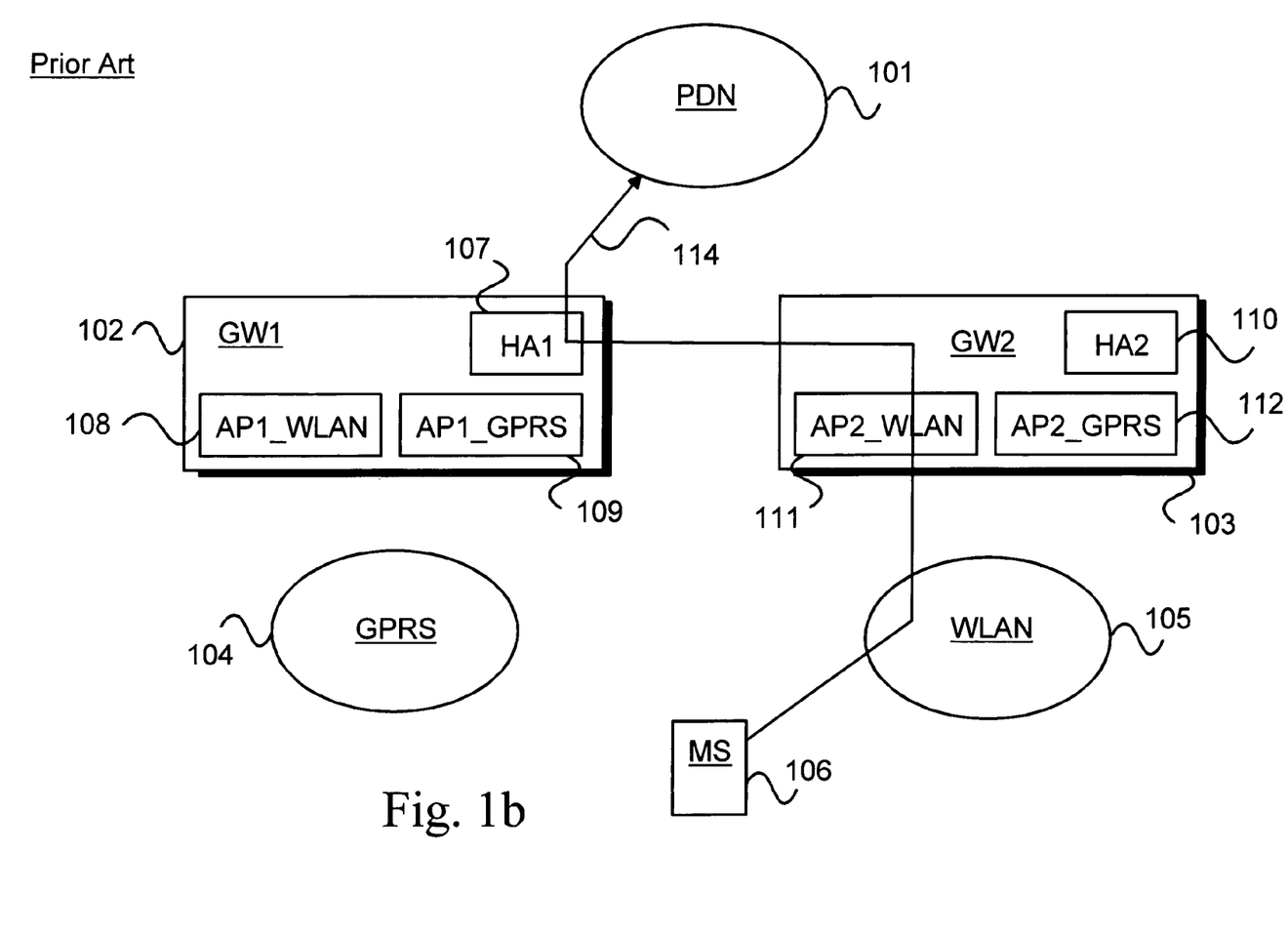

One of these problems relates to handovers between GPRS and WLAN not being seamless. This problem is illustrated in FIGS. 1a-1b. FIGS. 1a-1b disclose a packet data network 101, a first gateway 102, a second gateway 103, a GPRS mobile access system 104, a WLAN mobile access system 105, a terminal device 106, a first home agent 107, a first WLAN access point 108, a first GPRS access point 109, a second home agent 110, a second WLAN access point 111 and a second GPRS access point 112. FIG. 1a illustrates a situation before a handover, whereas FIG. 1b illustrates the situation after the handover. As illustrated by arrow 113 in FIG. 1a, the terminal device 106 has GPRS access to the packet data network 101 via the GPRS mobile access system 104 and the first GPRS access point 109 at the first gateway 102. Furthermore, the terminal device 106 has registered itself with the first home agent 107 at the first gateway 102. Therefore, all the IP traffic to and from the terminal device 106 will be routed via the first home agent 107 at the first gateway 102, as illustrated by arrow 113.

A need may arise for the terminal device 106 to switch its mobile access from GPRS to WLAN. For example, the terminal device 106 may move to an area where GPRS reception is unacceptably poor but where WLAN reception is acceptable. The problem with prior art in such a situation is the randomness of the selection of the subsequent access point. When the terminal device 106 wants to create a WLAN or GPRS connection, it uses an Access Point Name (APN) to specify to which external packet data network it requires to establish a connection. In the example of FIGS. 1a-1b, the terminal device 106 uses an Access Point Name specifying the packet data network 101. When, as is often the case in real life implementations, there are multiple suitable access points corresponding to the specified Access Point Name, a Domain Name System server selects one of the multiple suitable access points. The selection by the Domain Name System server is typically random, due to e.g. load balancing issues. The Domain Name System server may utilize e.g. round robin in selecting the access point.

Therefore, in our example, the second WLAN access point 111 at the second gateway 103 will be selected by chance during the handover from GPRS to WLAN. Yet, at the same time, the IP traffic will still need to be routed via the first home agent 107 at the first gateway 102 since that is the home agent the terminal device 106 registered itself with. The result is illustrated in FIG. 1b. All the IP traffic to and from the terminal device 106 will be routed via both the second gateway 103 and the first gateway 102, as illustrated by arrow 114.

Obviously, in order to optimize routing it would have been desirable to be able to specifically select the first WLAN access point 108 which is located in the same gateway 102 as the home agent 107 used. However, due to the random nature of the prior art access point selection by the Domain Name System server, this is not possible. As a result, Mobile IP based handover between GPRS and WLAN is not seamless.

Yet another problem associated with prior art relates to isolating mobile terminal devices infected with viruses and other malicious software. As the mobile terminal devices are getting more software capabilities, they are also becoming more vulnerable to viruses. If a network can detect a misbehaving mobile terminal device, it should be able to either disconnect the terminal device from the network or it should be able to make sure that the misbehaving terminal device is not causing any additional damage to other terminal devices and network elements. In the latter case, one way is to use a dedicated gateway for infected terminals to provide quarantined access to services. However, since in prior art the Domain Name System server randomly selects the gateway, the terminal device access cannot be anchored to any dedicated gateway.

Therefore, the object of the present invention is to alleviate the problems described above and to introduce a mechanism that allows providing a fixed access point for a terminal device.

SUMMARY OF THE INVENTION

A first aspect of the present invention is a method of providing a fixed access point for a terminal device. An identifier of a terminal device is received. One of multiple access points is assigned to serve as a fixed access point for the terminal device based on the received identifier of the terminal device, wherein each of the multiple access points is arranged to interface at least one of multiple mobile access systems with a packet data network. A notification about the assignment of the fixed access point is transmitted to at least one of the terminal device and a gateway node serving the terminal device. It is to be understood that the term 'fixed' in relation to an access point is herein used to disclose the access point being permanent over multiple subsequent sessions and over handovers between various mobile access systems.

A second aspect of the present invention is a system of providing a fixed access point for a terminal device. The system comprises a terminal device, a packet data network and multiple mobile access systems. The system further comprises multiple network nodes, each of which network nodes comprises at least one access point, each access point arranged to interface at least one of the mobile access systems with the packet data network. At least one of the multiple network nodes further comprises a fixed access point assigner arranged to assign one of the access points to serve as a fixed access point for the terminal device based on a received identifier of the terminal device. At least one of the multiple network nodes further comprises a notification transmitter arranged to transmit to at least one of the terminal device and a gateway node serving the terminal device a notification about the assignment of the fixed access point.

A third aspect of the present invention is a network node. The network node comprises at least one access point arranged to interface at least one of multiple mobile access systems with a packet data network. The network node further comprises a fixed access point assigner arranged to assign one of the at least one access point comprised in the network node and another access point comprised in another network node to serve as a fixed access point for a terminal device, based on a received identifier of the terminal device. The network node further comprises a notification transmitter arranged to transmit to at least one of the terminal device and a gateway node serving the terminal device a notification about the assignment of the fixed access point.

A fourth aspect of the present invention is a computer program embodied on a computer readable medium for providing a fixed access point for a terminal device. The computer program controls a data-processing device to perform the steps of:

receiving an identifier of a terminal device, assigning one of multiple access points to serve as a fixed access point for the terminal device based on the received identifier of the terminal device, wherein each of the multiple access points is arranged to interface at least one of multiple mobile access systems with a packet data network, and transmitting, to at least one of the terminal device and a gateway node serving the terminal device, a notification about the assignment of the fixed access point.

A fifth aspect of the present invention is a network node which comprises at least one access point means for interfacing at least one of multiple mobile access systems with a packet data network. The network node further comprises a fixed access point assigning means for assigning one of the at least one access point means comprised in the network node and another access point means comprised in another network node to serve as a fixed access point means for a terminal device, based on a received identifier of the terminal device. The network node further comprises a notification transmitting means for transmitting to at least one of the terminal device and a gateway node serving the terminal device a notification about the assignment of the fixed access point means.

A sixth aspect of the present invention is a gateway node serving a terminal device. The gateway node comprises a notification receiver arranged to receive a notification about assignment of one of multiple access points to serve as a fixed access point for the terminal device, wherein each of the multiple access points is arranged to interface at least one of multiple mobile access systems with a packet data network. The gateway node further comprises a forwarder arranged to forward data traffic from the terminal device to the fixed access point in response to the received notification.

A seventh aspect of the present invention is a terminal device. The terminal device comprises a notification receiver arranged to receive a notification about assignment of one of multiple access points to serve as a fixed access point for the terminal device, wherein each of the multiple access points is arranged to interface at least one of multiple mobile access systems with a packet data network. The terminal device further comprises a transmitter arranged to transmit data traffic from the terminal device to the fixed access point in response to the received notification.

In an embodiment of the invention, the identifier of the terminal device is received in a request to forward data traffic from the terminal device to a network node comprising the fixed access point in order to test software disposed in the network node.

In an embodiment of the invention, the identifier of the terminal device is received in a message about the terminal device being infected. It is to be understood that the term 'infected' is herein used to disclose infection by malicious software, such as e.g. viruses, trojans, and worms.

In an embodiment of the invention, an access point comprised in a network node arranged to quarantine infected terminal devices is assigned to serve as the fixed access point for the terminal device.

In an embodiment of the invention, the identifier of the terminal device is received in a request by the terminal device to access the packet data network via one of the multiple mobile access systems.

In an embodiment of the invention, before assigning the fixed access point, one of the multiple access points is assigned to serve as an arbitrary access point for the terminal device. Then, a session initiation request comprising the identifier of the terminal device is sent to the assigned arbitrary access point. The session initiation request is forwarded from the assigned arbitrary access point to the assigned fixed access point, and the requested session is initiated with the assigned fixed access point in response to receiving the forwarded session initiation request.

In an embodiment of the invention, the notification about the assignment of the fixed access point is transmitted in a session initiation response to at least one of the terminal device and the gateway node serving the terminal device.

In an embodiment of the invention, the notification about the assignment of the fixed access point is transmitted via the assigned arbitrary access point to at least one of the terminal device and the gateway node serving the terminal device.

In an embodiment of the invention, the session initiation request is forwarded from the assigned arbitrary access point to the assigned fixed access point via an Internet Protocol tunnel. Furthermore, the notification about the assignment of the fixed access point is first transmitted via the Internet Protocol tunnel until the assigned arbitrary access point from which the notification is further transmitted to at least one of the terminal device and the gateway node serving the terminal device.

In an embodiment of the invention, the identifier of the terminal device is bound to an address of one of the multiple access points. Furthermore, the one of the multiple access points to the address of which the received identifier of the terminal device is bound, is assigned to serve as the fixed access point.

In an embodiment of the invention, the identifier of the terminal device is bound to an address of an access point comprised in a network node which further comprises a home agent associated with the terminal device.

In an embodiment of the invention, a network node comprising a home agent associated with the terminal device is searched for, and, if the network node is found, an access point comprised in the found network node is assigned to serve as the fixed access point.

The invention allows providing a fixed access point for a terminal device as opposed to the randomly changing access point of the prior art. As a result, Mobile IP based handover between GPRS and WLAN will be seamless. As another result, the present invention allows using a dedicated gateway for infected terminals to provide quarantined access to network services. As yet another result, the present invention facilitates testing software, e.g. a new software release, disposed in such a 'live' network node which comprises at least one access point, by allowing e.g. a network operator to define a restricted group of test terminal devices which alone are initially allowed to utilize the network node and the at least one network node comprised in it.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 2:
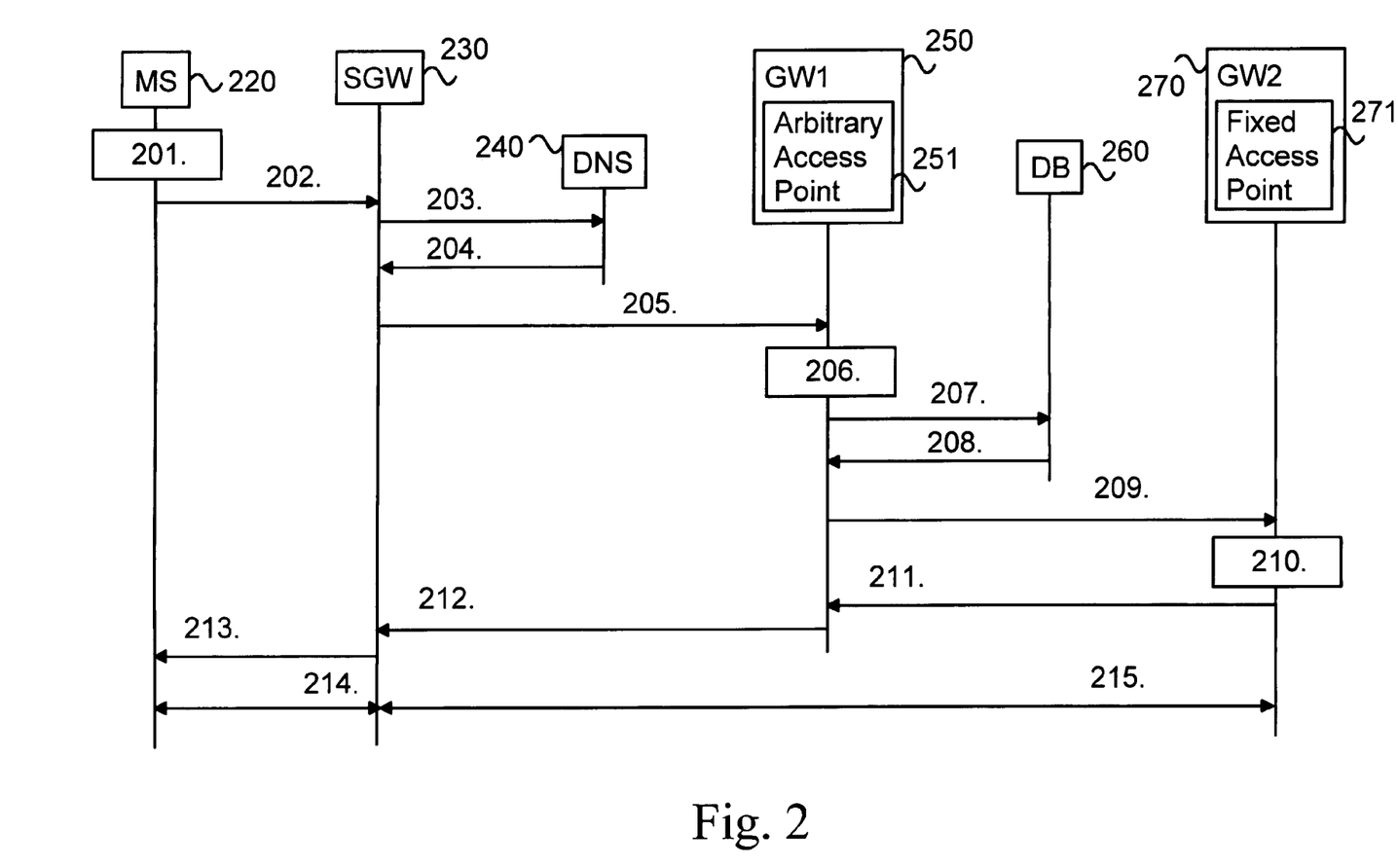
FIG. 2 is a flow diagram illustrating a method according to an embodiment of the present invention.

FIG. 2 illustrates an embodiment of the method of the present invention relating to providing a fixed access point for a terminal device, wherein each of multiple access points is arranged to interface at least one of multiple mobile access systems with a packet data network.

First, terminal device 220 initiates a procedure to access a packet data network via one of the multiple mobile access systems available, step 201. In case of GPRS and WLAN, this procedure is referred to as 'Access, Authentication and Authorization (AAA)'. In the embodiment of the present invention illustrated in FIG. 2, the terminal device 220 sends the request to a serving gateway 230, step 202. In case of GPRS, the serving gateway 230 may be e.g. a Serving GPRS Support Node (SGSN) which is a prior art network node typically delivering packets to and from GPRS enabled terminal devices within its service area. In case of WLAN, the serving gateway 230 may be e.g. a WLAN Access Controller. However, it should be noted that some implementations of mobile access systems may not utilize any serving gateway. The request sent by the terminal device 220 comprises an identifier of the terminal device 220 which is subsequently received by the serving gateway 230. The identifier of the terminal device 220 may be e.g. a Mobile Subscriber Integrated Services Digital Network (MSISDN) number of the subscriber associated with the terminal device 220. Alternatively, the identifier of the terminal device 220 may be e.g. an International Mobile Subscriber Identity (IMSI) of the subscriber associated with the terminal device 220. In case of GPRS, the request sent by the terminal device 220 to the serving gateway 230 may be e.g. an 'Activate PDP Context Request' message. In case of WLAN, the request sent by the terminal device 220 to the serving gateway 230 may be e.g. a policy equivalent to the 'Activate PDP Context Request' message.

In the embodiment of the present invention illustrated in FIG. 2, having received the identifier of the terminal device 220, the serving gateway 230 sends a query message to a Domain Name System server 240 at step 203. As per prior art, the Domain Name System server 240 assigns one of available access points to serve as an arbitrary access point for the terminal device 220. In the embodiment of the present invention illustrated in FIG. 2, the assigned arbitrary access point is the access point 251 comprised in a first gateway 250. The Domain Name System server 240 sends a response message to the serving gateway 230, step 204. The response message may include e.g. an Internet Protocol address of the assigned arbitrary access point 251.

Next, at step 205, a session initiation request is sent from the serving gateway 230 to the first gateway 250 comprising the assigned arbitrary access point 251. In case of GPRS, the session initiation request sent by the serving gateway 230 to the first gateway 250 may be e.g. a 'Create PDP Context Request' message. In any case, the session initiation request sent by the serving gateway 230 to the first gateway 250 comprises the identifier of the terminal device 220. At step 206, in accordance with the present invention, one of the available access points is assigned to serve as a fixed access point by utilizing new and inventive software and/or hardware (not illustrated in FIG. 2) arranged in connection with the first gateway 250.

In an embodiment, the first gateway 250 selects one of the available access points to serve as a fixed access point. The first gateway 250 may select e.g. an access point comprised in a network node which also comprises a home agent (not illustrated in FIG. 2) associated with the terminal device 220 in order to avoid the above described handover related problems of prior art. In another embodiment, the first gateway 250 selects an access point comprised in a network node arranged to quarantine infected terminal devices if the identifier of the terminal device 220 was received in a message about the terminal device 220 being infected. In an embodiment, the first gateway 250 binds the address, e.g. an Internet Protocol address, of the selected access point and the identifier of the terminal device 220 to each other. In an embodiment, the binding information may be stored in a data base 260. Therefore, while assigning the fixed access point, the first gateway 250 may search the database 260 in case previously stored binding information related to the identifier of the terminal device 220 were to be found, steps 207-208. If previously stored binding information related to the identifier of the terminal device 220 were found at the data base 260, the first gateway 250 would assign the access point indicated by the binding information to serve as the fixed access point. In this manner, the assigned access point will be 'fixed' since the same access point will be assigned over multiple subsequent sessions and over handovers between various mobile access systems, as opposed to randomly assigned access points of prior art. If the terminal device 220 gets infected, the binding information in the data base 260 may be updated to indicate e.g. an access point comprised in a network node arranged to quarantine infected terminal devices.

In another embodiment, rather than storing the binding information in a data base, the binding information may be configured at the first gateway 250 in such a way that a same identifier of the terminal device 220 results in a same address of the fixed access point. For example, the binding may be defined as a hash function from the identifier of the terminal device 220 to the address of the fixed access point. Furthermore, a list of terminals under quarantine may be maintained. That is, a list containing exceptions to the binding defined by the hash function may be maintained.

In yet another embodiment, the data base 260 may contain information about which home agents are associated with which terminal devices. In this embodiment, the first gateway 250 may query the data base 260, steps 207-208, to find an access point in a network node which also comprises the home agent associated with the terminal device 220.

In the embodiment of the present invention illustrated in FIG. 2, an access point 271 comprised in a second gateway 270 is assigned to serve as the fixed access point.

At step 209, the session initiation request is forwarded from the first gateway 250 to the second gateway 270 comprising the assigned fixed access point 271. An Internet Protocol tunnel may be established for this purpose between the first gateway 250 and the second gateway 270. In case of GPRS, e.g. GPRS Tunneling Protocol (GTP) may be used for establishing the tunnel, whereas in case of WLAN, e.g. Internet Key Exchange mobility extensions (MOBIKE) may be utilized for this purpose. At step 210, the requested session is initiated at the second gateway 270. Having initiated the requested session, a session initiation response is sent, step 211, first from the second gateway 270 to the first gateway 250, and then onwards from the first gateway 250 to the serving gateway 230, step 212. If the Internet Protocol tunnel was established between the first gateway 250 and the second gateway 270 for step 209, the established tunnel may be used also for step 211. In case of GPRS, the session initiation response may be e.g. a 'Create PDP Context Response' message. The serving gateway 230 may also inform the terminal device 220 about the assignment of the fixed access point 271, step 213. Thereafter, data traffic associated with the initiated session will be routed via the assigned fixed access point 271, steps 214-215.

Figure 3:
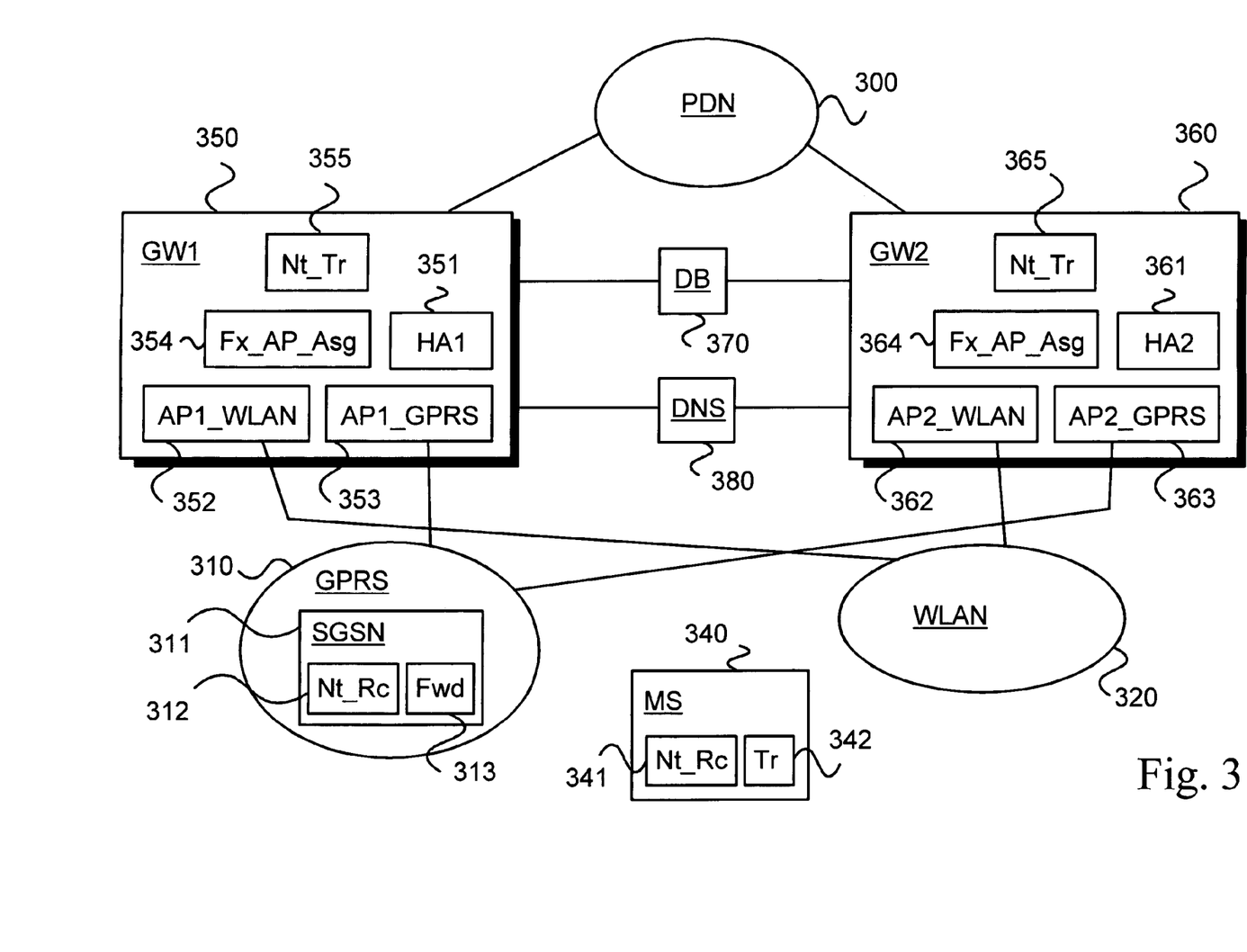
FIG. 3 is a block diagram illustrating a system according to an embodiment of the present invention.

FIG. 3 illustrates an embodiment of the system of the present invention relating to providing a fixed access point for a terminal device.

The system disclosed in FIG. 3 comprises a terminal device 340, a packet data network 300 and a GPRS mobile access system 310 as well as a WLAN mobile access system 320. The system disclosed in FIG. 3 further comprises two gateway network nodes 350 and 360. The first gateway network node 350 comprises a first GPRS access point 353 and a first WLAN access point 352. The second gateway network node 360 comprises a second GPRS access point 363 and a second WLAN access point 362. The GPRS access points 353 and 363 are arranged to interface the GPRS mobile access system 310 with the packet data network 300, whereas the WLAN access points 352 and 362 are arranged to interface the WLAN mobile access system 320 with the packet data network 300. The first gateway network node 350 further comprises a first home agent 351. The second gateway network node 360 further comprises a second home agent 361. The system disclosed in FIG. 3 further comprises a database 370 and a domain name server 380.

In accordance with the present invention, the first gateway network node 350 further comprises a first fixed access point assigner 354 arranged to assign one of the access points 352, 353, 362, 363 to serve as a fixed access point for the terminal device 340 based on a received identifier of the terminal device 340. The first gateway network node 350 further comprises a first notification transmitter 355 arranged to transmit to at least one of the terminal device 340 and a gateway node (not illustrated in FIG. 3) serving the terminal device 340 a notification about the assignment of the fixed access point.

Correspondingly, the second gateway network node 360 further comprises a second fixed access point assigner 364 arranged to assign one of the access points 352, 353, 362, 363 to serve as a fixed access point for the terminal device 340 based on a received identifier of the terminal device 340. The second gateway network node 360 further comprises a second notification transmitter 365 arranged to transmit to at least one of the terminal device 340 and a gateway node (not illustrated in FIG. 3) serving the terminal device 340 a notification about the assignment of the fixed access point.

In an embodiment, at least one of the first fixed access point assigner 354 and the second fixed access point assigner 364 is further arranged to assign such an access point to serve as the fixed access point which is comprised in a network node arranged to quarantine infected terminal devices, in response to the identifier of the terminal device received in a message about the terminal device being infected. In an embodiment, at least one of the first fixed access point assigner 354 and the second fixed access point assigner 364 is further arranged to assign one of the access points to serve as the fixed access point in response to the identifier of the terminal device 340 received in a request by the terminal device 340 to access the packet data network 300 via one of the mobile access systems 310 and 320.

In the embodiment of the present invention illustrated in FIG. 3, the domain name server 380 is arranged to assign one of the access points 352, 353, 362, 363 to serve as an arbitrary access point for the terminal device 340.

Further in the embodiment of the present invention illustrated in FIG. 3, at least one of the first fixed access point assigner 354 and the second fixed access point assigner 364 is further arranged to bind the identifier of the terminal device 340 to an address of one of the access points 352, 353, 362, 363. The identifier of the terminal device 340 may be bound to e.g. an address of an access point comprised in a network node which comprises a home agent associated with the terminal device 340. For example, if the first home agent 351 is associated with the terminal device 340 and the terminal device 340 is requesting GPRS access, the address of the first GPRS access point 353 may be bound to the identifier of the terminal device 340. Correspondingly, if the second home agent 361 is associated with the terminal device 340 and the terminal device 340 is requesting WLAN access, the address of the second WLAN access point 362 may be bound to the identifier of the terminal device 340. The binding may stored in data base 370.

Further in the embodiment of the present invention illustrated in FIG. 3, the GPRS mobile access system 310 comprises a gateway node 311 serving the terminal device 340. The serving gateway node 311 comprises a notification receiver 312 arranged to receive the notification about the assignment of one of the access points to serve as the fixed access point for the terminal device 340. The serving gateway node 311 further comprises a forwarder 313 arranged to forward data traffic from the terminal device 340 to the fixed access point in response to the received notification.

Further in the embodiment of the present invention illustrated in FIG. 3, the terminal device 340 comprises a notification receiver 341 arranged to receive the notification about the assignment of one of the access points to serve as the fixed access point for the terminal device 340. The terminal device 340 further comprises a transmitter 342 arranged to transmit data traffic from the terminal device 340 to the fixed access point in response to the received notification.

It should be noted that even though FIG. 3 describes both the notification receiver 312 disposed in the serving gateway node 311 and the notification receiver 341 disposed in the terminal device 340, both of them may not be needed. Typically, if an embodiment utilizes a serving gateway, then this serving gateway will comprise a notification receiver in which case another notification receiver disposed in a terminal device will not be needed. Correspondingly, even though FIG. 3 describes both the forwarder 313 disposed in the serving gateway node 311 and the transmitter 342 disposed in the terminal device 340, both of them may not be needed. Typically, if an embodiment utilizes a serving gateway, then this serving gateway will comprise a forwarder in which case a transmitter disposed in a terminal device will not be needed.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
receiving an identifier of a terminal device;
assigning one of multiple access points to serve as a fixed access point for said terminal device based on said received identifier of said terminal device, each of said multiple access points configured to interface at least one of multiple mobile access systems with a packet data network; and
directing transmission, to at least one of said terminal device and a gateway node serving said terminal device, of a notification about said assignment of said fixed access point.

2. The method according to claim 1, wherein said receiving comprises receiving said identifier of said terminal device in a request to forward data traffic from said terminal device to a network node comprising said fixed access point in order to test software disposed in said network node.

3. The method according to claim 1, wherein said receiving comprises receiving said identifier of said terminal device in a message about said terminal device being infected.

4. The method according to claim 3, wherein said assigning comprises assigning an access point comprised in a network node configured to quarantine infected terminal devices.

5. The method according to claim 1, wherein said receiving comprises receiving said identifier of said terminal device in a request by said terminal device to access said packet data network via one of said multiple mobile access systems.

6. The method according to claim 5, further comprising:
assigning, before said assigning said fixed access point, one of said multiple access points to serve as an arbitrary access point for said terminal device;
directing sending, to said assigned arbitrary access point, of a session initiation request comprising said identifier of said terminal device;
directing forwarding of said session initiation request from said assigned arbitrary access point to said assigned fixed access point; and
initiating the requested session with said assigned fixed access point in response to receiving said forwarded session initiation request.

7. The method according to claim 6, wherein said directing transmission comprises directing transmission of said notification in a session initiation response.

8. The method according to claim 6, wherein said directing transmission comprises directing transmission of said notification via said assigned arbitrary access point.

9. The method according to claim 8, wherein said directing forwarding comprises directing forwarding of said session initiation request via an internet protocol tunnel, and
wherein said directing transmission comprises directing transmission of said notification until said assigned arbitrary access point via said internet protocol tunnel.

10. The method according to claim 5, further comprising:
binding said identifier of said terminal device to an address of one of said multiple access points,
wherein said assigning the fixed access point comprises assigning, to serve as said fixed access point, said one of said multiple access points to the address of which said received identifier of said terminal device is bound.

11. The method according to claim 10, wherein said binding comprises binding said identifier of said terminal device to an address of an access point comprised in a network node which further comprises a home agent associated with said terminal device.

12. The method according to claim 5, wherein said assigning the fixed access point comprises searching for a network node comprising a home agent associated with said terminal device, and, if said network node is found, assigning an access point comprised in said found network node to serve as said fixed access point.

13. An apparatus comprising at least one processor and at least one memory including computer program code, the at least one memory and the computer program code configured to, with the at least one processor, cause the apparatus at least to:
   direct interfacing of at least one of multiple mobile access systems with a packet data network;
   assign one of at least one of an access point comprised in said apparatus and another access point comprised in another apparatus to serve as a fixed access point for a terminal device, based on a received identifier of said terminal device; and
   direct transmission, to at least one of said terminal device and a gateway node serving said terminal device, of a notification about said assignment of said fixed access point.

14. The apparatus according to claim 13, wherein said apparatus is further caused to assign an access point to serve as said fixed access point, the access point being comprised in a network node configured to quarantine infected terminal devices, the assigning being performed in response to said received identifier of said terminal device received in a message about said terminal device being infected.

15. The apparatus according to claim 13, wherein said apparatus is further caused to assign said one of said at least one access point comprised in said apparatus and said another access point comprised in said another apparatus to serve as said fixed access point in response to said identifier of said terminal device received in a request by said terminal device to access said packet data network via one of said multiple mobile access systems.

16. The apparatus according to claim 15, wherein said apparatus is further caused to bind said received identifier of said terminal device to an address of said one of said at least one access point comprised in said apparatus and said another access point comprised in said another apparatus, and
   wherein said apparatus is further caused to assign, to serve as said fixed access point, the access point to the address of which said received identifier of said terminal device is bound.

17. The apparatus according to claim 16, wherein said apparatus is further caused to bind said received identifier of said terminal device to an address of an access point comprised in a network node which further comprises a home agent associated with said terminal device.

18. The apparatus according to claim 15, wherein said apparatus is further caused to search for a network node comprising a home agent associated with said terminal device, and, when said network node is found, assigning an access point comprised in said found network node to serve as said fixed access point.

19. A system comprising:
   a terminal device;
   a packet data network;
   multiple mobile access systems; and
   multiple network nodes, each network node comprising at least one access point, each access point configured to interface at least one of said mobile access systems with said packet data network;
   wherein at least one of said multiple network nodes further comprises
   a fixed access point assigner configured to assign one of said access points to serve as a fixed access point for said terminal device based on a received identifier of said terminal device, and
   a notification transmitter configured to transmit to at least one of said terminal device and a gateway node serving said terminal device a notification about said assignment of said fixed access point.

20. A computer readable medium having a computer program stored thereon, the computer program being configured to control a data-processing device to perform the following:
   receiving an identifier of a terminal device;
   assigning one of multiple access points to serve as a fixed access point for said terminal device based on said received identifier of said terminal device, each of said multiple access points configured to interface at least one of multiple mobile access systems with a packet data network; and
   directing transmission, to at least one of said terminal device and a gateway node serving said terminal device, of a notification about said assignment of said fixed access point.

21. An apparatus comprising:
   at least one access point means for interfacing at least one of multiple mobile access systems with a packet data network;
   a fixed access point assigning means for assigning one of said at least one access point means comprised in said apparatus and another access point means comprised in another apparatus to serve as a fixed access point means for a terminal device, based on a received identifier of said terminal device; and
   a notification transmitting means for directing transmission to at least one of said terminal device and a gateway node serving said terminal device of a notification about said assignment of said fixed access point means.

22. An apparatus comprising at least one processor and at least one memory including computer program code, the at least one memory and the computer program code configured to, with the at least one processor, cause the apparatus at least to:
   receive a notification about assignment of one of multiple access points to serve as a fixed access point for a terminal device, each of said multiple access points configured to interface at least one of multiple mobile access systems with a packet data network; and
   forward data traffic from said terminal device to said fixed access point in response to said received notification.

23. An apparatus comprising at least one processor and at least one memory including computer program code, the at least one memory and the computer program code configured to, with the at least one processor, cause the apparatus at least to:
   receive a notification about assignment of one of multiple access points to serve as a fixed access point for said apparatus, each of said multiple access points configured to interface at least one of multiple mobile access systems with a packet data network; and
   direct transmission of data traffic to said fixed access point in response to said received notification.

24. The apparatus according to claim 23, wherein the apparatus is further caused to transmit an identifier of the apparatus.

25. The apparatus according to claim 24, wherein the identifier is transmitted in a request to access said packet data network via one of said multiple mobile access systems.

26. The apparatus according to claim 24, wherein the identifier is transmitted in a request to forward data traffic to a network node comprising said fixed access point in order to test software disposed in said network node.

27. The apparatus according to claim 24, wherein the identifier is transmitted in a message about said terminal device being infected.

* * * * *